US008893416B1

(12) United States Patent
McKenzie

(10) Patent No.: US 8,893,416 B1
(45) Date of Patent: Nov. 25, 2014

(54) POLICE VEHICLE VERIFICATION METHOD

(76) Inventor: DeAndre LaShawn McKenzie, Woodbridge, VA (US)

( * ) Notice: Subject to any disclaimer, the term of this patent is extended or adjusted under 35 U.S.C. 154(b) by 0 days.

(21) Appl. No.: 13/419,685

(22) Filed: Mar. 14, 2012

(51) Int. Cl.
*G09F 21/04* (2006.01)
*B60R 13/00* (2006.01)

(52) U.S. Cl.
CPC *G09F 21/04* (2013.01); *B60R 13/00* (2013.01)
USPC ............ 40/591; 40/491; 40/208; 40/582; 359/630; 359/275; 359/242; 701/431; 701/436

(58) Field of Classification Search
CPC .............................. G09F 21/04; B60R 13/00
USPC ............ 40/591, 491, 208, 582; 359/630, 275, 359/242; 701/431, 436
See application file for complete search history.

(56) References Cited

U.S. PATENT DOCUMENTS

| 1,902,440 | A |   | 3/1933 | Gill, Jr. |
| 2,005,757 | A |   | 6/1935 | Scott |
| 2,421,277 | A |   | 5/1947 | Luce |
| 3,096,596 | A |   | 7/1963 | Magnuson et al. |
| 4,240,220 | A |   | 12/1980 | Smith |
| 4,884,351 | A |   | 12/1989 | Abramson |
| 4,955,153 | A | * | 9/1990 | Albrecht et al. ............. 40/661 |
| 5,339,351 | A |   | 8/1994 | Hoskinson et al. |
| 5,960,337 | A |   | 9/1999 | Brewster et al. |
| 6,205,203 | B1 |   | 3/2001 | Gorman et al. |
| 7,230,767 | B2 | * | 6/2007 | Walck et al. ............. 359/630 |
| 2006/0080875 | A1 | * | 4/2006 | Nelson et al. ............. 40/593 |
| 2008/0202004 | A1 |   | 8/2008 | Coleman |

FOREIGN PATENT DOCUMENTS

| GB | 2.147.542 | 5/1985 |
| GB | 2.331.393 | 5/1999 |
| WO | WO9952714 | 10/1999 |

OTHER PUBLICATIONS

Rex Roy, Unmarked Cop Cars & Urban Legends, Interter, Jul. 8, 2010 http://autos.aol.com/article/unmarked-cop-cars/.*
Townsquare News Network, "Persons of Interest" Sought in Officer's Slaying, Nov. 8, 2011 http://nj1015.com/persons-of-interest-sought-in-officers-slaying/.*
Adam, Georgia to Euthanise Lane Hogs, Mar 24, 2010 http://verbo.se/georgia-to-euthanise-lane-hogs.*

* cited by examiner

*Primary Examiner* — Syed A Islam
(74) *Attorney, Agent, or Firm* — Michael I. Kroll

(57) ABSTRACT

A vehicle identification system that provides means for verifying the identity and authenticity of pursuing law enforcement vehicles by means of reversed or "mirrored" character indicia being placed on a law enforcement vehicle's windshield denoting the vehicle's identification so a motorist may look in their rearview mirror, call a police station and give the law enforcement vehicle identification to an operator who gives instruction to the motorist.

1 Claim, 11 Drawing Sheets

POLICE VEHICLE VERIFICATION METHOD

BACKGROUND OF THE INVENTION

1. Field of the Invention

The present invention relates generally to vehicular identification and, more specifically, to a identification system for motorists that have been pulled over, to verify the validity of law enforcement vehicles whereby a substrate creates a one way viewable property that is utilized in producing indicia on the windshield of a police cruiser viewable only from the outside, with said indicia being applied with alphabetical and numerical characters reversed and mirrored so as to appear most legible through a perspective seen through a driver's rear view mirror. With reversed and mirrored characters identifying the law enforcement vehicle's ID number and law enforcement phone number, a pulled over driver may call up the law enforcement station, read the ID through their rear view mirror, proclaim it to the station and find out if it is a real police officer or an imposter, in the case of an imposter a real police officer would be dispatched by the called station to the caller.

2. Description of the Prior Art

There are other identification methods designed for verifying a police officer's identity. Typical of these is U.S. Pat. No. 1,902,440 issued to Gill on Mar. 21, 1933.

Another patent was issued to Scott on Jun. 25, 1935 as U.S. Pat. No. 2,005,757 Yet another U.S. Pat. No. 2,421,277 was issued to Luce on May 27, 1947 and still yet another was issued on Jul. 9, 1963 to Magnuson as U.S. Pat. No. 3,096,596.

Another patent was issued to Smith on Dec. 23, 1980 as U.S. Pat. No. 4,240,220 Yet another U.S. Pat. No. 4,884,351 was issued to Abramson on Dec. 5, 1989 Another was issued to Hoskinson et al. on Aug. 16, 1994 as U.S. Pat. No. 5,339,351 and still yet another was issued on Sep. 28, 1999 to Brewster et al. as U.S. Pat. No. 5,960,337.

Another patent was issued to Gorman on Mar. 20, 2001 as U.S. Pat. No. 6,205,203 Yet another U.K. Patent No. GB2147542 was issued to Cliffe on May 15, 1985. Another was issued to Perry on May 19, 1999 as U.K. Patent No. GB2331393 and still yet another was issued on Oct. 21, 1999 to Casper as International Patent Publication No. WO99/52714.

U.S. Pat. No. 1,902,440

Inventor: Edwin R. Gill Jr.

Issued: Mar. 21, 1933

A sign and significant portion of which is covered with a plurality of reflex reflecting elements, and a reflecting substance covering at least about the lower half of the surfaces of elements but leaving the upper portions of the surface unaffected.

U.S. Pat. No. 2,005,757

Inventor: John Scott

Issued: Jun. 25, 1935

A sign letter or character comprising a convexo-concave body of transparent glass shaped inside and out to the general form of the strokes of said letter or character and having as curved surface portion roughened and coated with light reflecting opaque material to form multitudinous angularly disposed irregular mirrored reflecting areas, said area being arranged according to a substantially non reoccurring pattern and adapted to diffusely reflect light impinged thereon.

U.S. Pat. No. 2,421,277

Inventor: Richard W. Luce

Issued: May 27, 1947

A light reflecting device comprising a relatively thin sheet of light transmitting material having one surface thereof formed with a plurality of spaced relatively small light-collecting lenses and plane surfaces intermittent the lenses and the opposite surface formed with plane surfaces opposite the lenses and prismatic reflectors intermediate the plane surfaces, the thickness of the sheet being such that the plane surface behind a lens is located at the point of greatest concentration of light by the lens from a point source at infinity and the prismatic reflectors being arranged to reflect light falling thereon from a source fixed with respect thereto in a predetermined direction other than retrodirectively.

U.S. Pat. No. 3,096,596

Inventor: Elton E. Magnuson et al.

Issued: Jul. 9, 1963

An object of the present invention is to provide a reflective sign which has a weather resistive flat transparent protective covering that washes clean with rain or a wet sponge, and which has all of the elements thereof employed for visual effects protected and sealed from the atmosphere.

U.S. Pat. No. 4,240,220

Inventor: Barry Smith

Issued: Dec. 23, 1980

A reflector with illuminated indicia, such as for automotive use, comprising a translucent sheet-like material having reflecting elements on at least a portion of at least one surface thereof and indicia defining means on the rear surface portion of said translucent sheet-like material; reflecting material on the reflecting elements but not on the indicia; a dark, translucent material adjacent to the indicia on the rear surface portion of the translucent sheet-like material; translucent diffusing material adjacent the dark translucent material and located more remote from the translucent sheet-like material than the dark translucent material; and a source of illumination rearward of the translucent material. The invention is also directed to a method of making such a reflector and a method of modifying conventional reflectors.

U.S. Pat. No. 4,884,351

Inventor: Mare D. Abramson

Issued: Dec. 5, 1989

A sign for displaying reflective numerals which are slidably engaged in slots provided by a backing plate. The sign is adapted for display in any one of three modes, namely, a bottom portion of the backing plate is coupled with a base stand for upright positioning; or alternatively, the top portion of the plate is coupled to a hook assembly to allow for a hanging arrangement; or lastly, the backing plate may be simply attached to a flat surface.

U.S. Pat. No. 5,339,351

Inventor: John D. Hoskinson et al.

Issued: Aug. 16, 1994

A 911 emergency response system that includes a location identification module, preferably in solid state circuit form, associated with each residence or each extension of a PBX is disclosed. Preferably, the location identification modules are powered by telephone line voltage. A location identification module is enabled when its associated telephone goes off-hook and an emergency code, e.g., 911 is dialed. Thereafter, in response to an inquiry from the emergency response center that receives the emergency call, the location identification module sends the location of the associated telephone to the emergency response center operator where the location is displayed on a dispatcher's console.

U.S. Pat. No. 5,960,337

Inventor: Beth S. Brewster et al.

Issued: Sep. 28, 1999

A method for improving the provision of emergency assistance services for an emergency site. An observer of an emergency event contacts an Emergency Assistance Services (EAS) operator, using a telephone to describe the type of emergency event and any special circumstances present. The EAS operator also receives the present location of the observer, using a location determination system that is connected to the telephone used by the observer. The EAS operator is provided with an electronic map showing the location of the observer and the location of at least one available EAS responder for the type of emergency event that has occurred. The EAS operator determines whether a given EAS responder has the equipment and/or trained personnel required to respond to the emergency event and, from a group of EAS responders who do so qualify, selects an EAS responder who is estimated to be able to reach the emergency site in the shortest time. The selected EAS responder is assigned to respond to the emergency event, and the EAS operator optionally monitors the EAS responder to verify that this responder has reached the emergency site. If the assigned EAS responder does not reach the emergency site, the EAS operator optionally and promptly assigns another EAS responder to the emergency event. The LD system can be a Satellite Positioning System, such as GPS or GLONASS, or can be an FM subcarrier system.

U.S. Pat. No. 6,205,203

Inventor: Andrew J. Gorman et al.

Issued: Mar. 20, 2001

An emergency response system has a radio transmitter activated by dialing one or more programmable sequences of emergency digits dialed on the telephone, which transmits an encoded radio signal to a flashing strobe beacon visible to an emergency response team to assist in locating the emergency. The flashing strobe beacon is responsive only to the encoded signal, is easily relocated and requires no hard wired connection.

U.K. Patent Number GB2147542

Inventor: Nicholas Ronald Cliffe

Published: May 11, 1985

A printed article comprises a layer 11 of a glow material such as a natural or synthetic phosphorescent or fluorescent material or a reflective microbead material together with a translucent pigment material which may be incorporated in the layer (FIG. 1) or in a separate overlayer 15. The glow layer may be printed in a selected pattern, or applied as an overall uniform layer and overprinted with a non-glow or contrast material 14. Articles such as advertising or warning signs, decorative panels and even T-shirts and other clothing can be printed and will display different colour effects under different levels of illumination.

U.K. Patent Number GB2331393

Inventor: Andrew Graham Perry

Published: May 19, 1999

A display sign (1) such as for personal use by a motorist on a motor vehicle, wherein at least one region (3) of the sign, which may be indicia or background, is separated from another (2) by a boundary and the sign has a different reflectivity on either side of the boundary. In particular such a display sign has a capital letter L or P on a differentially reflective background. Also a set of such display signs has a first sign having a reflective white background and a second sign having a non-reflective white background.

International Patent Publication Number WO9952714

Inventor: Mark S. Casper

Published: Oct. 21, 1999

A business document contains a removable decal. The decal has a plastic substrate overlaid with a reflective coating including an aluminum coating and glass beads. A toner receptor coating overlies the reflective coating. A fine screen pattern is printed on the toner coating and which pattern may include jagged lines or closely spaced dots. Variable and non-variable information is then printed on the toner receptive coating. In the event of use of a solvent to alter the printed information on the decal, the fine printed screen pattern is likewise disrupted and evidences alteration of the decal.

While these identification methods may be suitable for the purposes for which they were designed, they would not be as suitable for the purposes of the present invention, as hereinafter described.

SUMMARY OF THE PRESENT INVENTION

A primary object of the present invention is to provide a method for law enforcement vehicle identification for a motorist to verifying the authenticity of a pursuing vehicle having the appearance of a law enforcement vehicle.

Another object of the present invention is to provide a method for law enforcement vehicle identification comprising applying unique law enforcement identification indicia to a law enforcement vehicle.

Yet another object of the present invention is to provide a method for law enforcement vehicle identification comprising applying unique law enforcement identification indicia to the front of said law enforcement vehicle.

Still yet another object of the present invention is to provide a method for law enforcement vehicle identification comprising applying unique law enforcement identification indicia to the front body of said law enforcement vehicle.

An additional object of the present invention is to provide a method for law enforcement vehicle identification comprising applying unique law enforcement identification indicia to the windshield of said law enforcement vehicle.

A further object of the present invention is to provide a method for law enforcement vehicle identification comprising applying unique law enforcement identification indicia to the rear of said law enforcement vehicle.

A yet further object of the present invention is to provide a method for law enforcement vehicle identification comprising applying unique law enforcement identification indicia to the rear body of said law enforcement vehicle.

A still yet further object of the present invention is to provide a method for law enforcement vehicle identification comprising applying unique law enforcement identification indicia to the rear windshield of said law enforcement vehicle.

Another object of the present invention is to provide a method for law enforcement vehicle identification wherein said law enforcement identification indicia comprises a law enforcement label such as, police, county police, state police, or other law enforcement nomenclature.

Yet another object of the present invention is to provide a method for law enforcement vehicle identification wherein said law enforcement identification indicia comprises a law enforcement vehicle unique identification.

Still yet another object of the present invention is to provide a method for law enforcement vehicle identification wherein said law enforcement identification indicia further comprises a contact phone number for the law enforcement agency division that can be used by a motorist having a communications device, such as a cell phone, to verify the authenticity of an apparent law enforcement vehicle by calling said number to verify with a law enforcement agency that a vehicle's displayed unique vehicle identification number is contained within a roster of verifiable law enforcement vehicles.

An additional object of the present invention is to provide a method for law enforcement vehicle identification wherein said law enforcement identification indicia is readable from left to right when facing said law enforcement vehicle having said identification indicia thereon.

A further object of the present invention is to provide a method for law enforcement vehicle identification wherein said law enforcement identification indicia is reversed and mirrored so that is readable from left to right when viewed by a motorist through their rear view mirror.

A yet further object of the present invention is to provide a method for law enforcement vehicle identification wherein said law enforcement identification indicia is manufactured from a thin film having at least a 40% transparency.

A still yet further object of the present invention is to provide a method for law enforcement vehicle identification wherein said thin film is a perforated vinyl that will not block the line of sight of the law enforcement officer.

Another object of the present invention is to provide a method for law enforcement vehicle identification wherein said thin film is reflective.

Yet another object of the present invention is to provide a method for law enforcement vehicle identification enabling a motorist to verify the identity and authenticity of a pursuing law enforcement vehicle utilizing reversed and mirrored character indicia that is viewable from a law enforcement vehicle.

Still yet another object of the present invention is to provide a method for law enforcement vehicle identification by placing viewable indicia on a front or rear surface of said law enforcement vehicle body.

An additional object of the present invention is to a method for law enforcement vehicle identification by placing one way viewable indicia on a front or rear windshield that is viewable from the outside without blocking the view from the inside of a vehicle.

A further object of the present invention is to provide a method for law enforcement vehicle identification thereby allowing a motorist to verify the identity and authenticity of a pursuing law enforcement vehicle whereby indicia on a vehicles windshield denotes a vehicles id number and characters for calling a station to authenticate the vehicle's ID.

Another object of the present invention is to provide a method for law enforcement vehicle identification for discriminating between real and imposter law enforcement officers.

Additional objects of the present invention will appear as the description proceeds.

The present invention overcomes the shortcomings of the prior art by providing a method for verifying the identity and authenticity of a pursuing law enforcement vehicle by means of reversed and mirrored character indicia being placed on said vehicles windshield denoting said vehicles ID so that a driver may look into their rear view mirror, call a station and relay the read information to the station operator wherethen instruction will be given by the station to the driver. Additionally, the indicia is one way viewable appearing transparent from the inside and can be only be seen from the outside of the vehicle.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
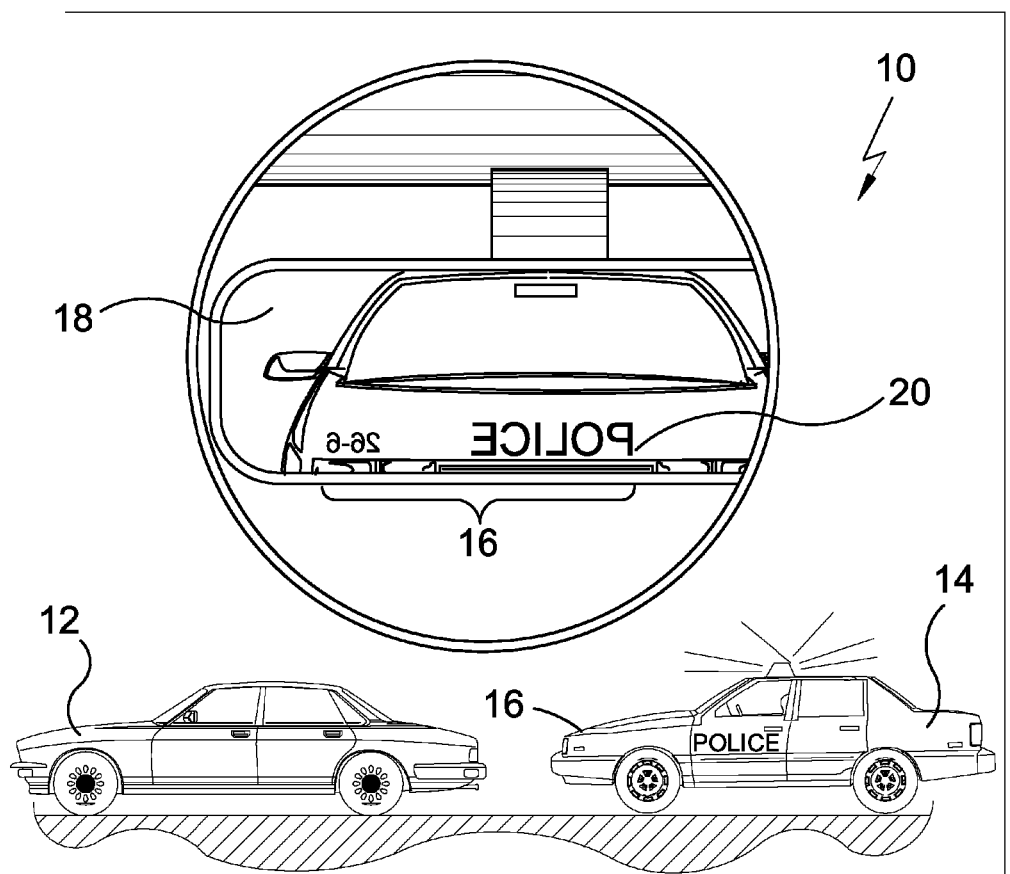
FIG. 1 is an illustrative view of the prior art of the present invention where a law enforcement vehicle is pulling a motorist over.

Turning now descriptively to the drawings, in which similar reference characters denote similar elements throughout the several views, the figures illustrate the Police Vehicle Verification Method of the present invention. With regard to the reference numerals used, the following numbering is used throughout the various drawing figures.

10 police vehicle verification method of the present invention
12 motorist vehicle
14 law enforcement vehicle
16 prior art vehicle indicia forward
18 motorist vehicle rearview mirror
20 prior art indicia reversed and mirrored
22 vehicle indicia in reverse
24 indicia in normal manner
26 windshield indicia viewable from outside only
28 indicia orientation
30 indicia orientation covering windshield
32 windshield
34 substrate
36 glass display matrix
38 transparent light element
40 activated light element
42 message array control
44 police number indicia in reverse
46 thin film
48 perforations

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the prior art of the present invention 10. Shown is the prior art of the present invention where a police cruiser or law enforcement vehicle 14 is stopping motor vehicle 12, typically when a driver is being pulled over they are made aware of this through their rearview mirror 18 where such visual cues 16 are reversed and mirrored 20 rendering any text or number sequence indistinguishable at a glance. Due to the danger of being pulled over by an impersonated officer it is advantageous for an operator being pulled over to call into a station to verify if it is an authentic law enforcement agency. With misrepresented visual input and unclear marking of vehicles in a mirror this option is not available or possible to the driver.

Figure 2:
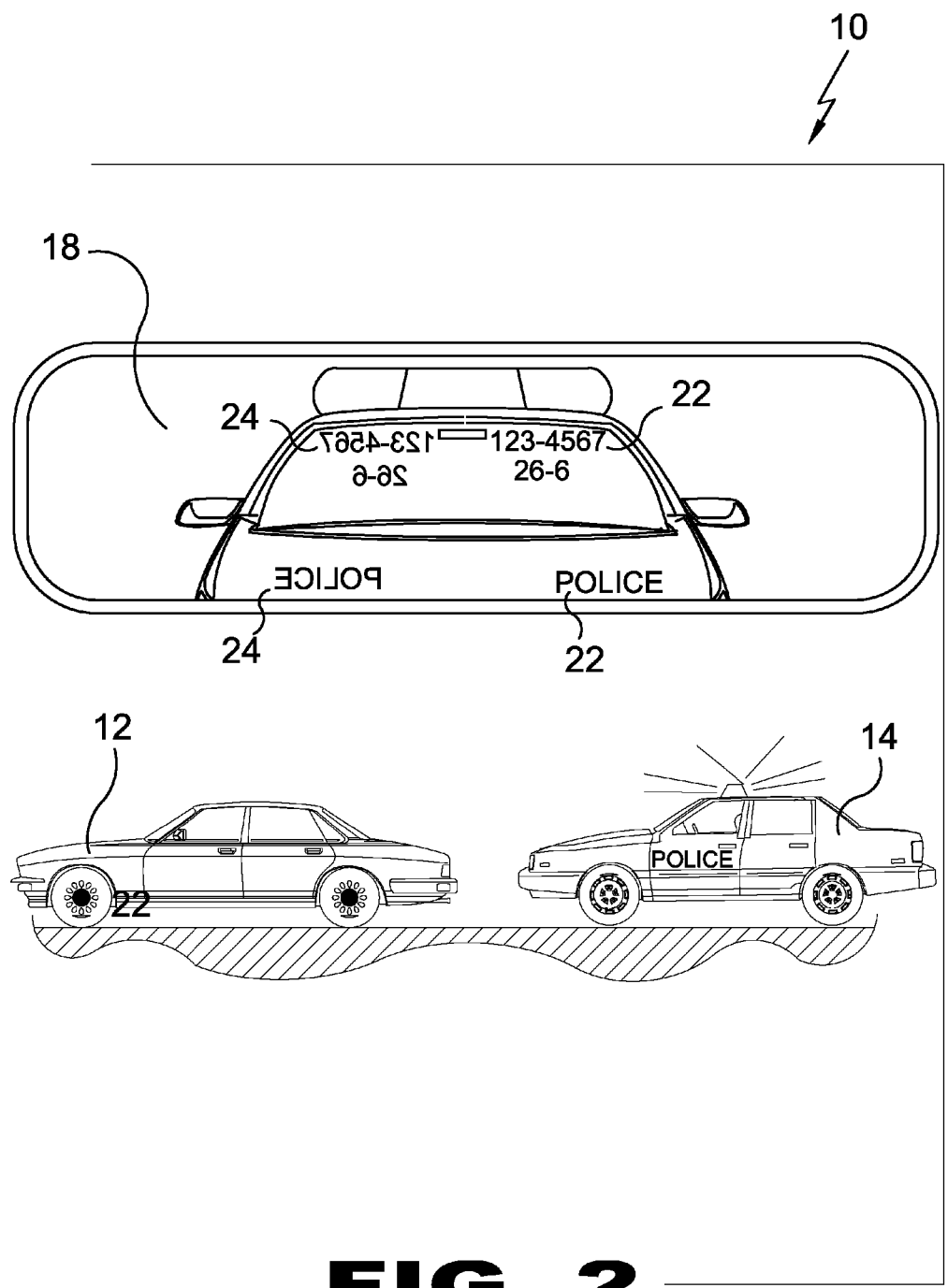
FIG. 2 is an illustrative view of the vehicle identification method of the present invention where the law enforcement vehicle has indicia in reverse and its reflection having normal legibility in a motorist's mirror.

FIG. 2 is an illustrative view of the present invention 10 in use. Shown is the present invention being a system for marking law enforcement vehicles 14 with normal indicia 24 and reverse mirrored indicia 22 to provide a means for a driver being pulled over 12, to quickly and correctly identify a law enforcement vehicle, its ID code number and contact number for the law enforcement agency department 22 when viewed through their rear view mirror 18. This allows citizens to more accurately identify and report the vehicle pulling them over.

Figure 3:
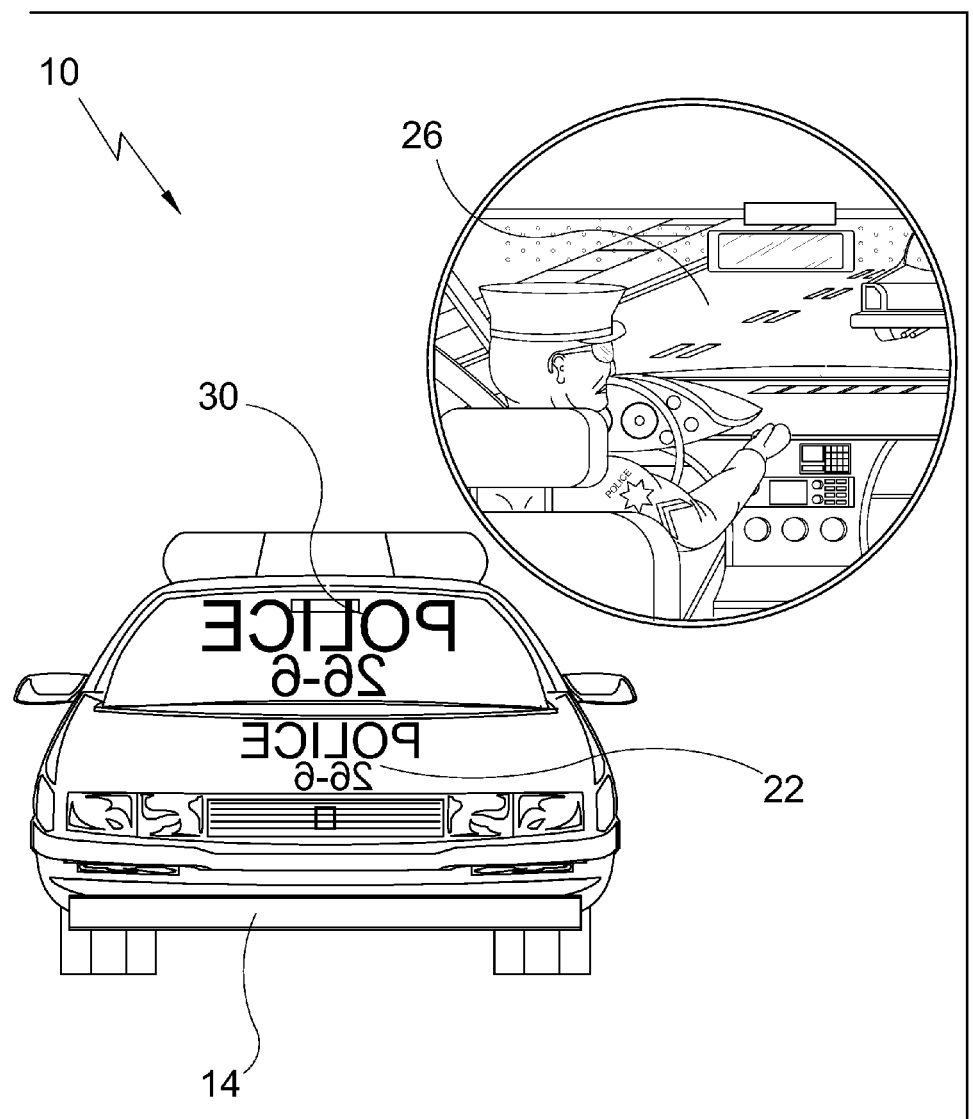
FIG. 3 is an illustrative view of the present invention having reverse indicia viewable only from the outside of the vehicle and not the inside of the vehicle.

FIG. 3 is an illustrative view of the present invention 10 in use. Shown is the present invention not only having reversed viewable indicia 22 on the vehicles window 30 but also indicia that is only viewable from the outside 26 of the vehicle allowing the invention to be applied to a cruiser window without obstructing or hindering a law enforcement officers view 26.

Figure 4:
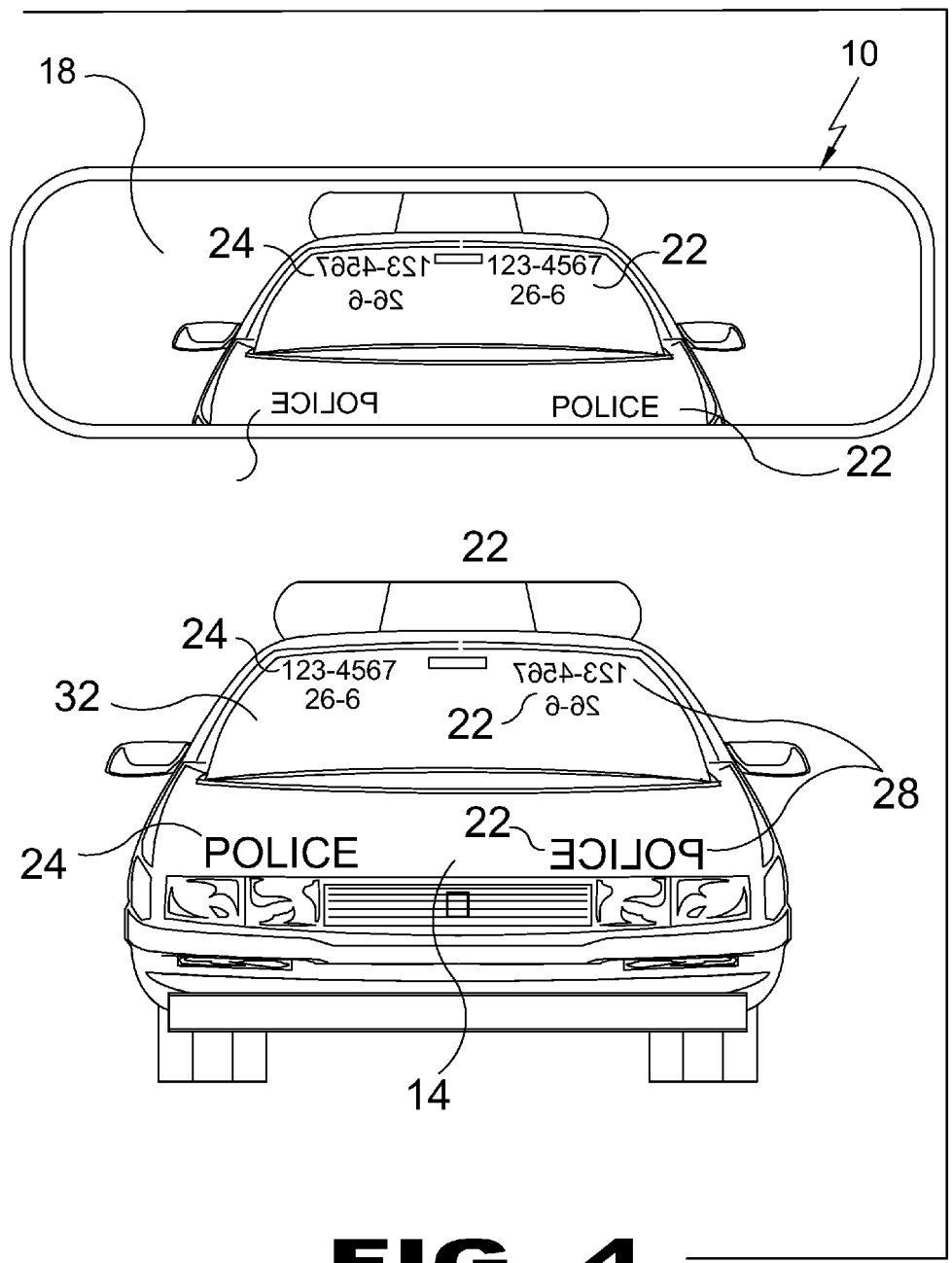
FIG. 4 is an illustrative view of the present invention having one possible orientation of reverse indicia.

FIG. 4 is an illustrative view of the present invention in use 10. Shown is one possible orientation 28 of reversed indicia 22 on the windshield 32 of a law enforcement vehicle 14.

Figure 5:
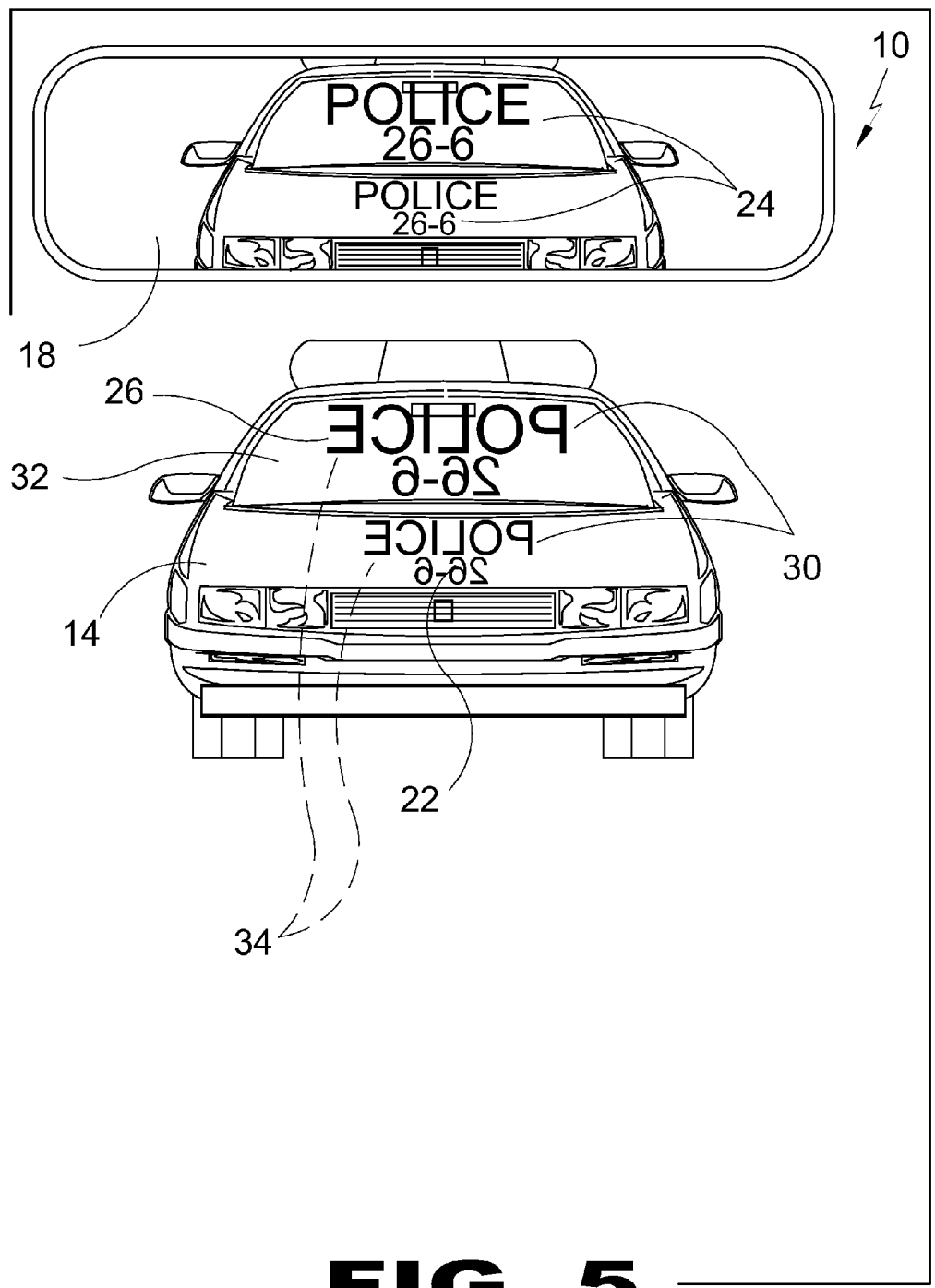
FIG. 5 is an illustrative view of the present invention having reverse indicia in one possible arrangement across the whole of the wind shield.

FIG. 5 is an illustrative view of the present invention 10 in use. Shown is the present invention in one possible arrangement 30 where the reversed identifying indicia 22 is covering the entire vehicles windshield 32. This is made possible utilizing a one way viewable, on way transparent material 34 that allows for its placement over a drivers line of sight without hindering said line of site 26.

Figure 6:
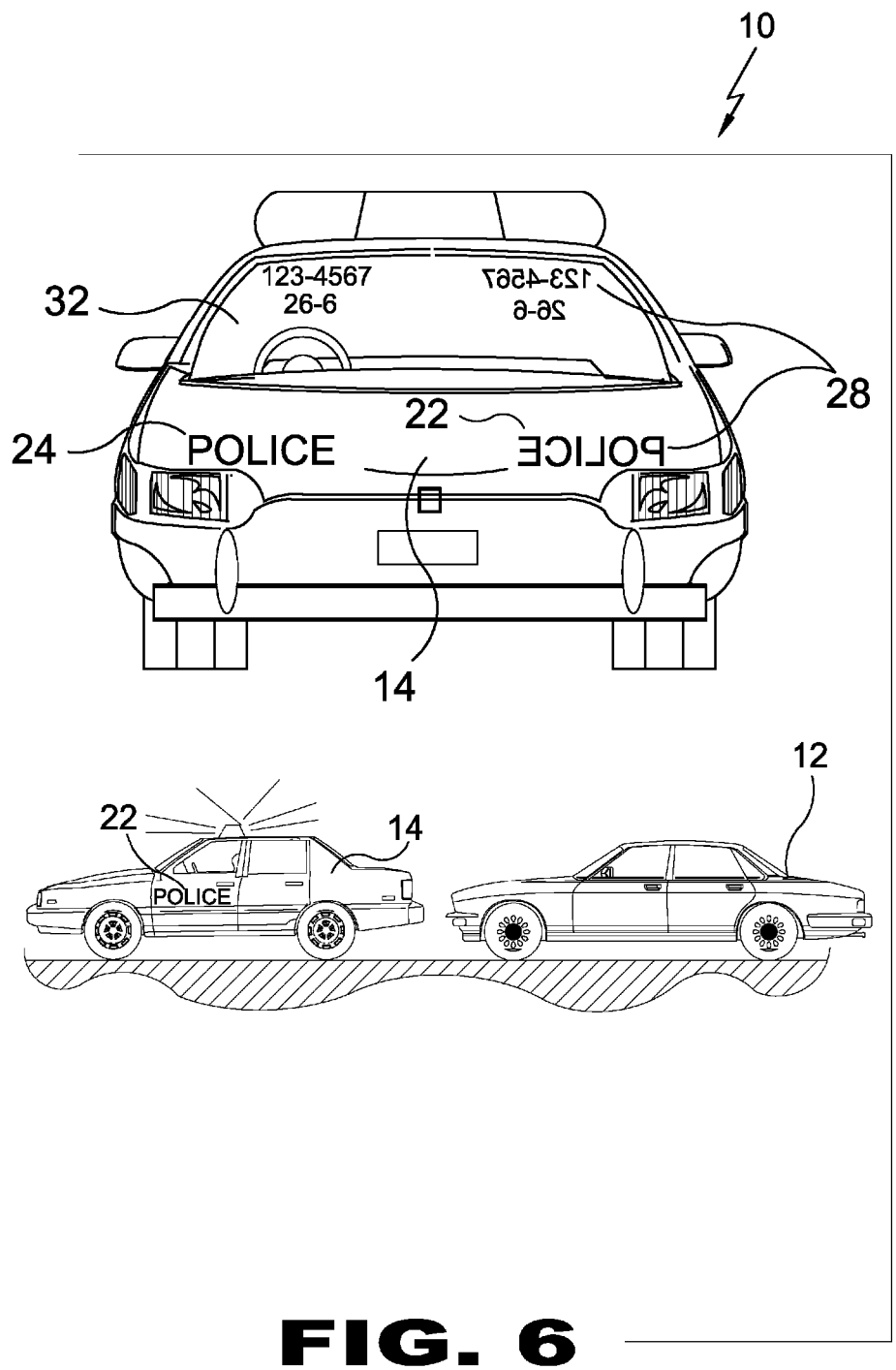
FIG. 6 is an illustrative view of the vehicle identification method of the present invention where the law enforcement vehicle has indicia in normal and reverse on the rear of the vehicle.

FIG. 6 is an illustrative view of the present invention 10 in use. Shown is the present invention being a system for marking law enforcement vehicles 14 with normal indicia 24 and reverse mirrored indicia 22 applied to the rear of the vehicle providing means for a driver being pulled over 12, to quickly and correctly identify a law enforcement vehicle, its ID code number and station phone number 24. This allows citizens to more accurately identify and report the vehicle pulling them over.

Figure 7:
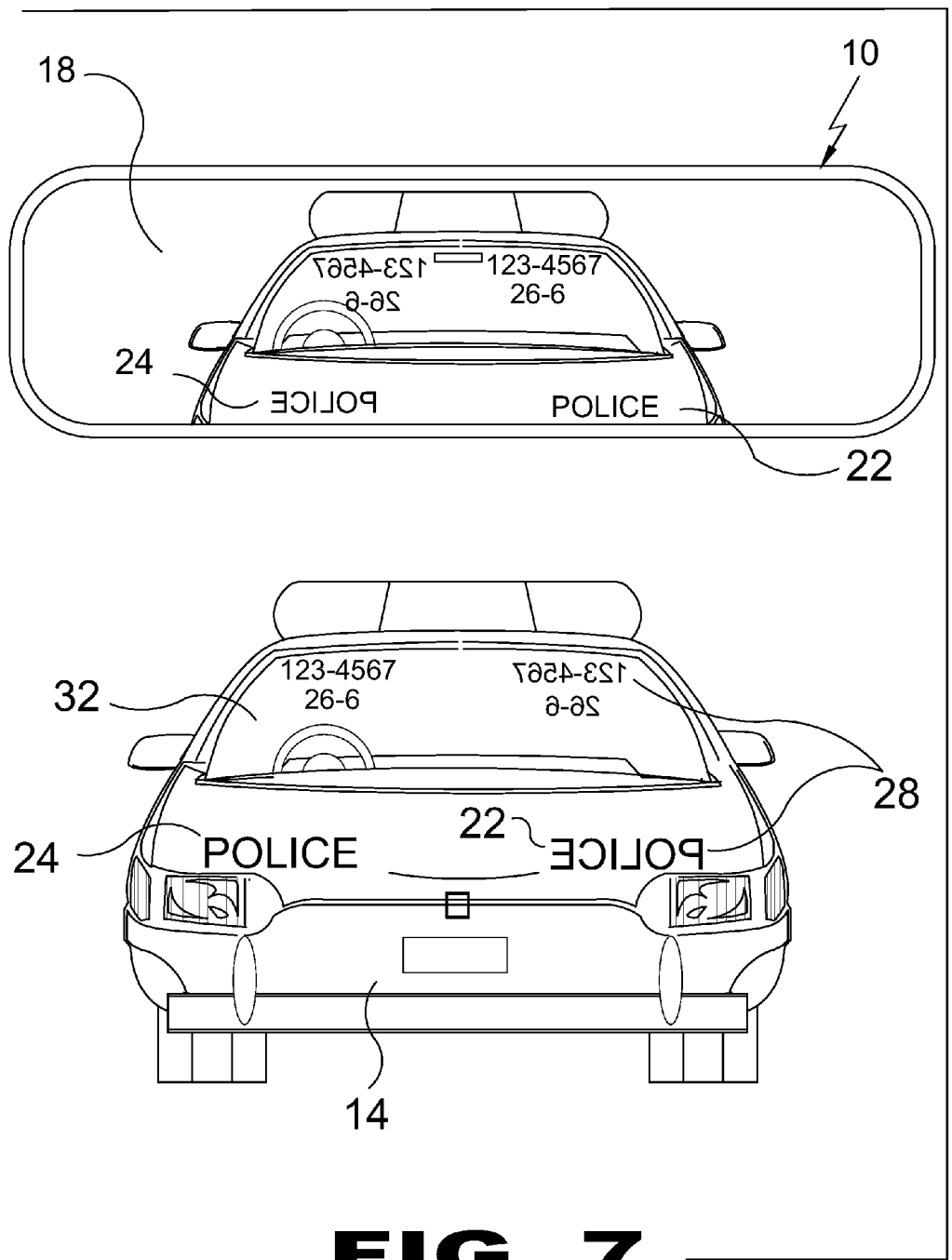
FIG. 7 is an illustrative view of the vehicle identification method of the present invention where the law enforcement vehicle has indicia in reverse on the rear of the vehicle and its reflection having normal legibility in a motorist's mirror.

FIG. 7 is an illustrative view of the present invention 10 in use. Shown is the present invention being a system for marking law enforcement vehicles 14 with normal indicia 24 and reverse mirrored indicia 22 to provide a means for a driver being pulled over 12, to quickly and correctly identify a law enforcement vehicle, its ID code number, and station phone number 22 through their rear view mirror 18. This allows citizens to more accurately identify and report the vehicle pulling them over.

Figure 8:
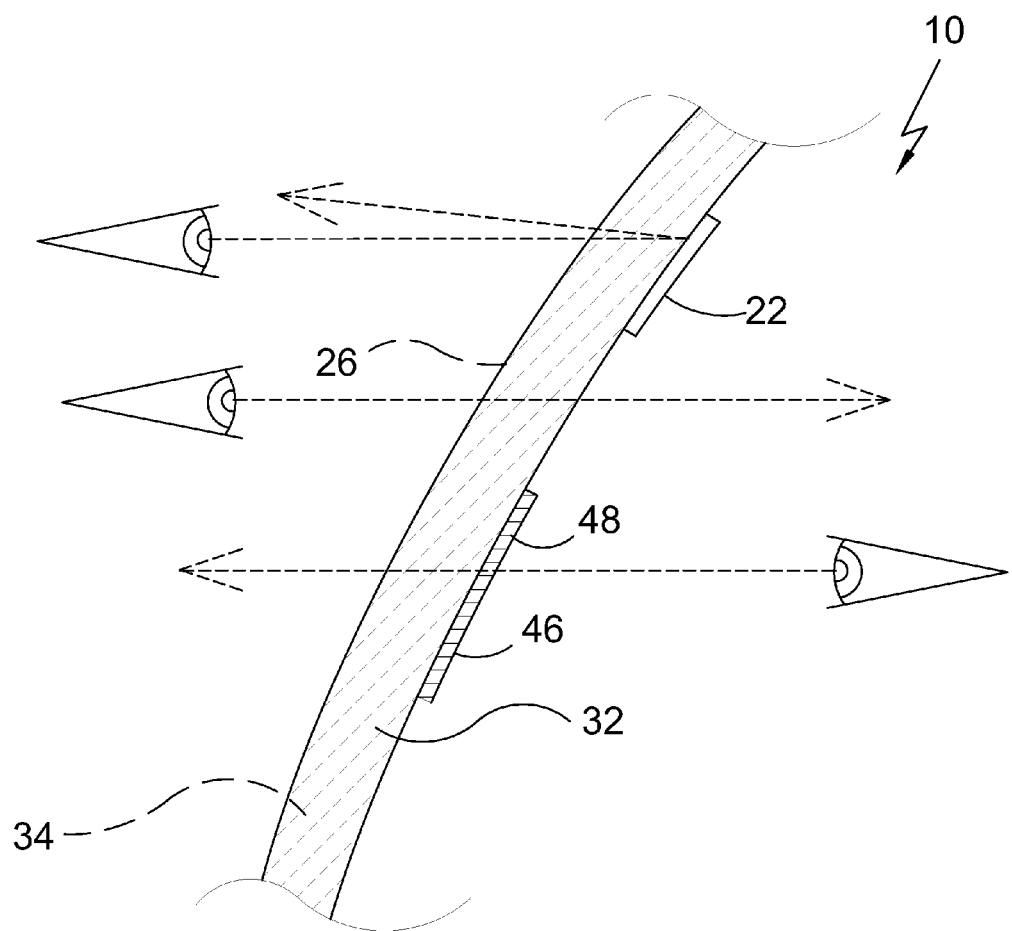
FIG. 8 is an illustrative view of the present invention in use having a substrate applied to the surface of the vehicle.

FIG. 8 is an illustrative view of the present invention 10 in use. Shown is the present invention having a substrate 34 applied to the surface of a law enforcement vehicles windshield 32 with said substrate 34 having a one way viewable 26 property whereby from the interior of the vehicle it appears transparent while from the outside of the vehicle it is opaque and clearly visible.

Figure 9:
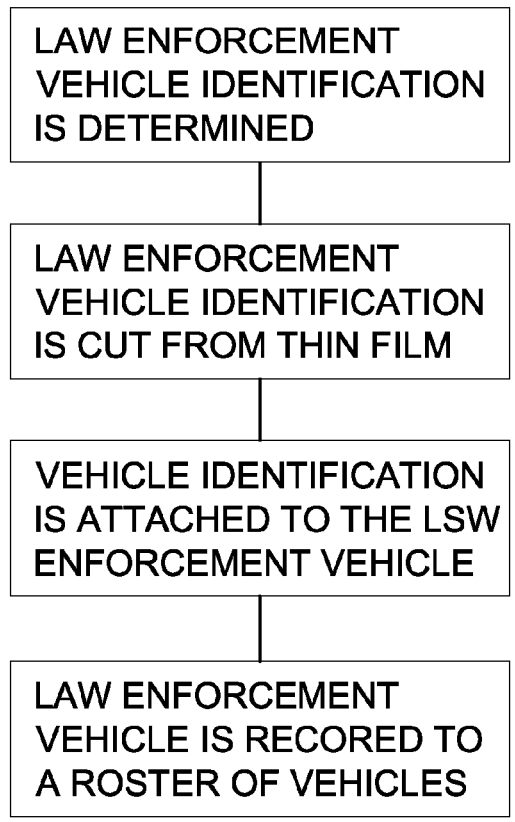
FIG. 9 is a chart describing the present invention in use.

FIG. 9 is a chart of the present invention in use. Shown is a chart describing the process that the present invention is applied to a police law enforcement vehicle.

Figure 10:
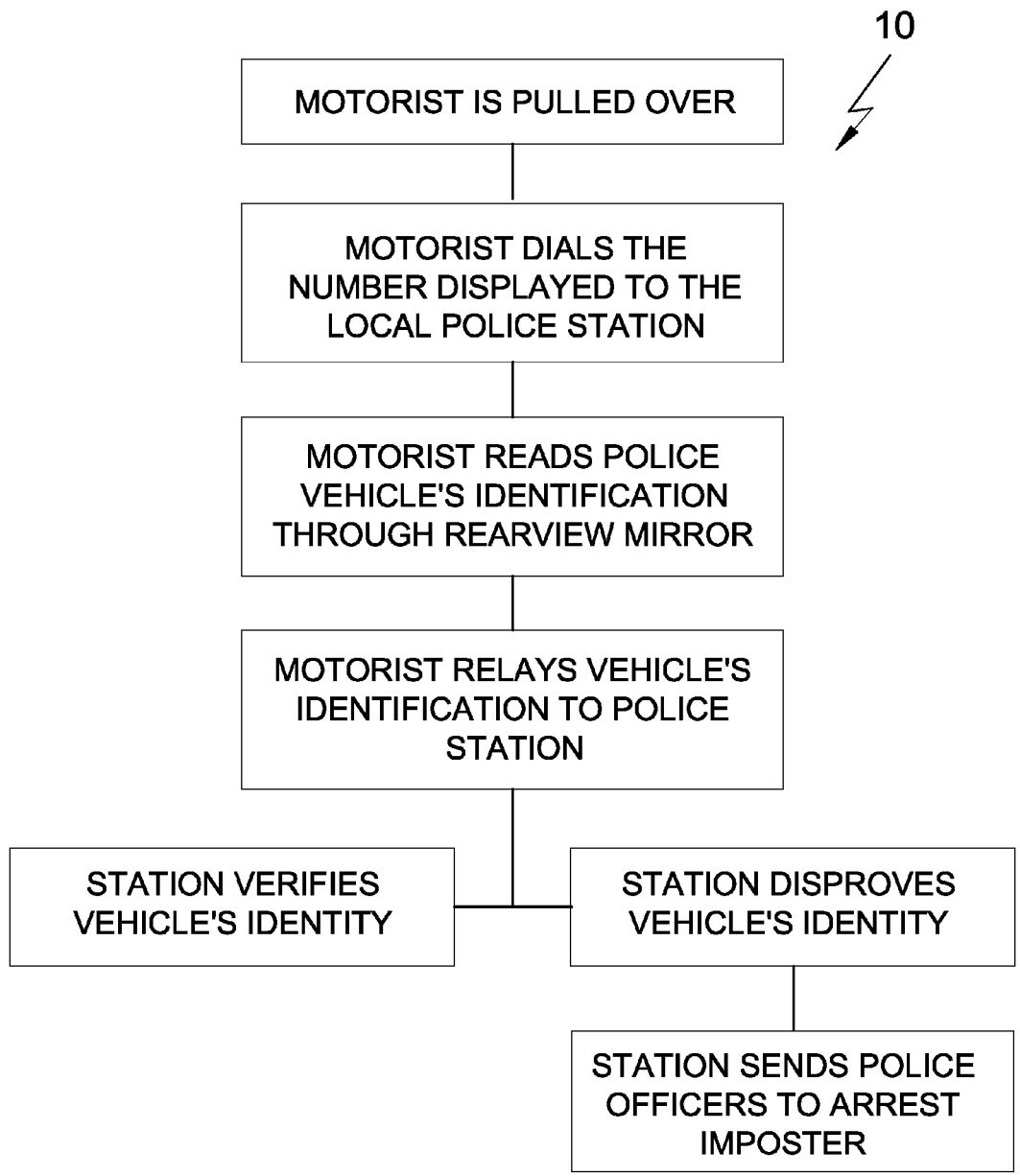
FIG. 10 is a chart describing the present invention in use.

FIG. 10 is a chart of the present invention in use. Shown is a chart of the present invention depicting how the verification system of the present invention in put into practice. A driver being pulled over calls the station, then looks into their rear view mirror for the police ID number, reports that number then receives a verdict from the station on the officer's identity.

Figure 11:
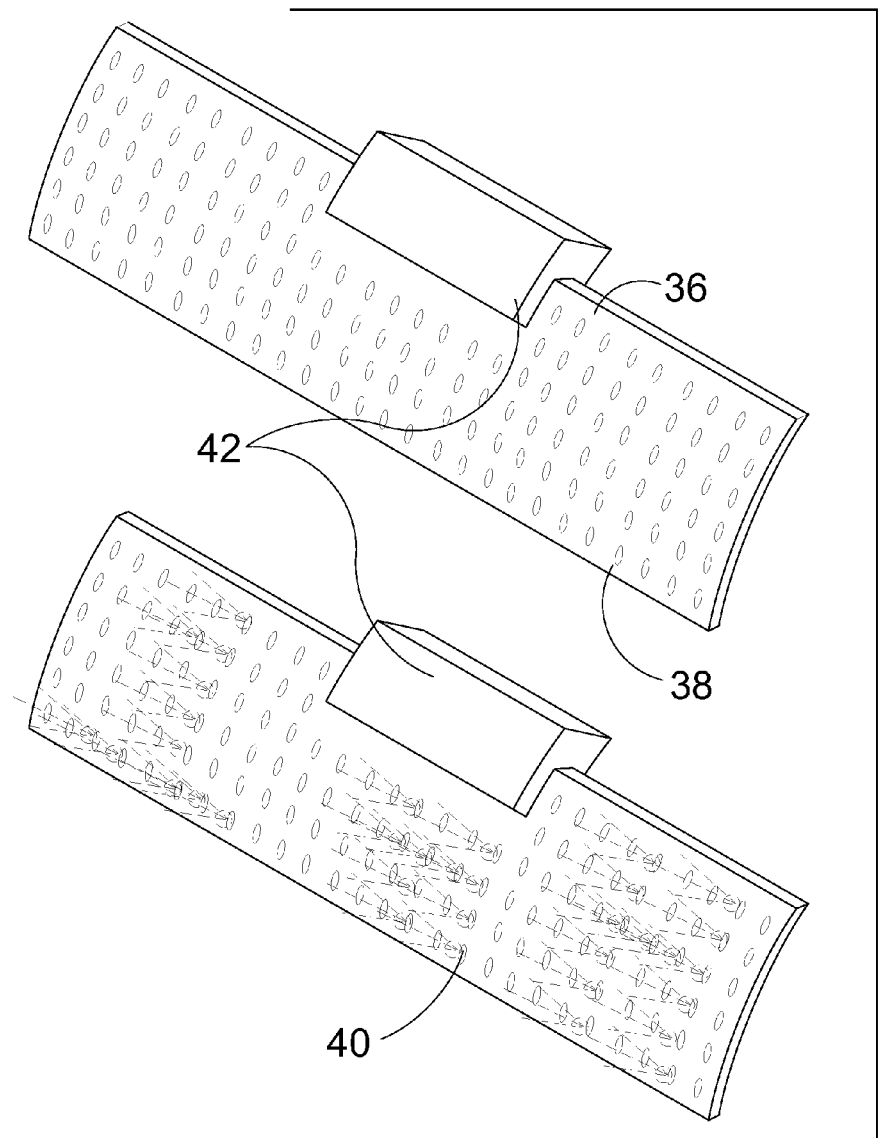
FIG. 11 is an additional element of the present invention whereby indicia are displayed using a glass having transparent lighting elements.

FIG. 11 is an additional element of the present invention 10. Shown is an additional element of the present invention whereby the one way transparent and rear view mirror indicia are presented and displayed by a message array control 42 using a glass 36 having a transparent lighting element 38 so that when a set of elements is actuated 40 the projected light is only viewable from the outside viewable surface.

What is claimed is new and desired to be protected by Letters Patent is set forth in the appended claims:

1. A method for law enforcement vehicle identification by a motorist comprising:
   a) said law enforcement vehicle stopping a motor vehicle driven by said motorist, said law enforcement vehicle pulling up directly behind;
   b) said motorist reading through a rear view mirror a mirror image of a unique law enforcement identification indicia in a display on said law enforcement vehicle, said law enforcement vehicle also displaying a telephone number, said display on a front windshield of said enforcement vehicle and comprising a message array control using a glass having transparent lighting elements whereby when said elements are actuated, projected light is only viewable from an outside viewable surface; and
   c) said motorist calling said telephone number while remaining in his vehicle to more accurately identify and report the vehicle pulling him over.

\* \* \* \* \*